No. 667,361. Patented Feb. 5, 1901.
A. M. BURLESON.
NUT LOCK.
(Application filed July 17, 1900.)
(No Model.)

Witnesses:
H. C. Rodgers
A. A. Cooper

Inventor
Andrew M. Burleson.
By Fischer & Thorpe
Attys.

THE NORRIS PETERS CO., PHOTO-LITHO., WASHINGTON, D. C.

UNITED STATES PATENT OFFICE.

ANDREW M. BURLESON, OF KANSAS CITY, KANSAS.

NUT-LOCK.

SPECIFICATION forming part of Letters Patent No. 667,361, dated February 5, 1901.

Application filed July 17, 1900. Serial No. 23,863. (No model.)

*To all whom it may concern:*

Be it known that I, ANDREW M. BURLESON, a citizen of the United States, residing at Kansas City, Wyandotte county, Kansas, have invented a new and useful Nut-Lock, of which the following is a specification.

My invention relates to nut-locks, and is designed especially for use with the nut-lock on which I filed application for patent May 14, 1900, and which is numbered 16,573 and was allowed June 27, 1900, my object in this connection being to provide an attachment whereby the nut may be unlocked and which adds but little to the cost and is thoroughly practical and reliable.

To this end the invention consists in certain novel and peculiar features of construction and combinations of parts, as will be hereinafter described and claimed.

To understand the invention fully, reference is to be had to the accompanying drawings, in which—

Figure 1:
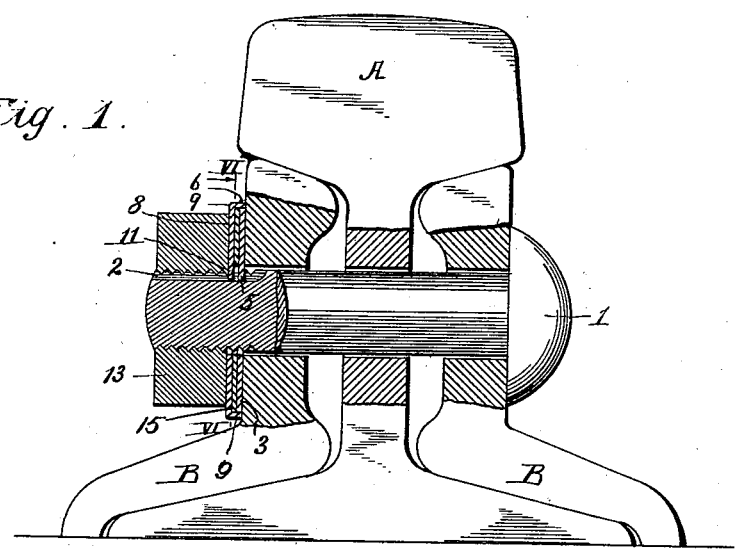
Figure 2:
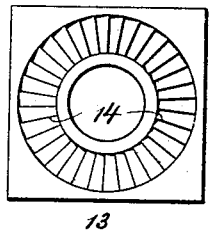
Figure 3:
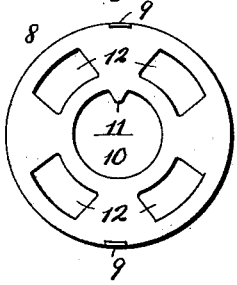
Figure 4:
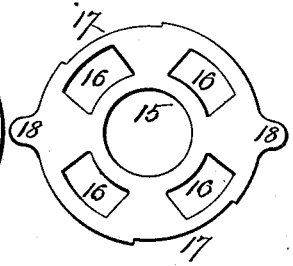
Figure 5:
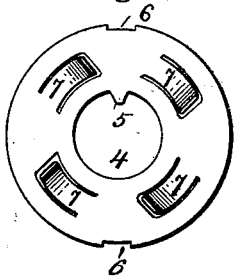
Figure 6:
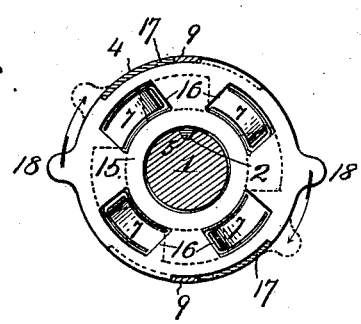
Figure 7:
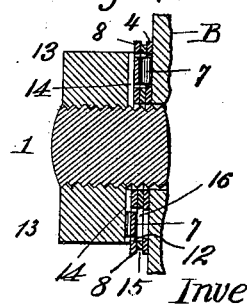

Figure 1 is a view, partially in cross-section, of a rail-joint provided with a nut-lock embodying my invention. Figs. 2, 3, 4, and 5 represent inner face views, respectively, of the nut, washer, unlocking-disk, and locking-plate. Fig. 6 is a section taken on the line VI VI of Fig. 1. Fig. 7 is a cross-section to show the engagement of the locking-plate and the nut.

Referring to the drawings in detail, 1 designates the bolt, provided with a longitudinal groove 2 in its threaded portion, said groove by preference being V-shaped in cross-section.

3 designates the nut-securing plate, the same being preferably of circular form and provided with a central opening 4 to receive the bolt and a substantially V-shaped tongue 5 to fit snugly in the groove 2 of the bolt to prevent rotatable movement of the plate thereon. The plate is also provided with peripheral notches 6 and with a plurality of spring arms or lugs 7, projecting in the same direction and diagonally outward from the plate, being preferably stamped out of said plate by means of a die.

8 designates the washer of substantially the same size and configuration as plate 3 and provided with lugs 9 to engage notches 6 of said plate to lock them from independent movement. Said washer is provided with a central opening 10 and with a V-shaped tongue 11, projecting in said opening. The washer is also provided with a plurality of elongated openings 12, through which are adapted to project the spring arms or lugs 7 of the plate 3.

The nut 13 is of ordinary construction, except that it is provided with a circular series of ratchet-teeth 14 concentrically of its threaded portion.

Referring now to the novel part of the present application, 15 designates a circular disk or washer fitting loosely upon the bolt between plate 3 and washer 8 and provided with openings 16, normally registering with openings 12. Said disk may be small enough to operate between lugs 9 or must be provided with peripheral recesses 17, through which said lugs may extend, as shown, and is also provided with peripheral lugs 18 to be struck by a hammer or engaged by a wrench for the purpose of turning the disk, and thereby withdrawing the spring-arms 7 from engagement with the nut-teeth.

In order to illustrate clearly the action and relation of the various parts composing this improved construction, I have shown it in connection with a rail-joint, in which A designates a rail, and B B fish-plates. The bolt 1 is fitted through the registering holes of the fish-plates and rail. The plate 3 is then slipped upon the bolt and against the contiguous fish-plate, the spring arms or lugs of the plate of course projecting outward and the tongue 5 engaging the groove of the bolt. Disk 15 is now fitted on the bolt with its openings 16, arranged to receive the outwardly-projecting arms 7. Washer 8 is now slipped upon the bolt with its tongue 11 engaging groove 2. This construction constitutes through the medium of the bolt an interlocked connection with the plate 3, with which it is further interlocked by the engagement of lugs 9 with notches 6, the spring arms or lugs 7 also projecting outward through openings 12. The nut is now screwed home upon the bolt and clamps the plate tightly up against the fish-plate or other object, being reliably locked against back rotation because of the engagement with its ratchet-toothed surface of the spring arms or lugs 7. With the washer interposed between the plate and nut the latter can press only against the free ends of the spring-arms, and as said arms cannot be pressed clear back to the plane of the body portion of the plate they are always in operative condition. To unlock the nut, as will be seen by reference to Fig. 6, it is only necessary to turn the disk in the direction indicated by the arrow in said figure, this action causing the rear ends of the openings 16 to act like a wedge on and force the spring-arms back from the teeth of the nut and permit the latter to be easily unscrewed.

From the above description it will be apparent that I have produced a nut-lock attachment which embodies the features of advantage enumerated as desirable in the statement of invention, and it is to be understood that I reserve the right to make such changes as properly fall within the spirit and scope of the appended claims.

Having thus described the invention, what I claim as new, and desire to secure by Letters Patent, is—

1. The combination with a nut-lock, comprising a bolt, a plate fitted non-rotatably thereon and provided with outwardly-projecting spring-arms, a disk fitting and adapted to be turned on the bolt and provided with openings through which said spring-arms project, and a nut engaging the bolt and provided with a ratchet-tooth face engaged by said spring-arms, substantially as described.

2. The combination with a nut-lock, comprising a grooved bolt, a plate fitted on the bolt and provided with a tongue engaging the bolt-groove and outwardly-projecting spring-arms, a disk fitting and adapted to be turned on the bolt and provided with openings through which said spring-arms project, and a nut engaging the bolt and provided with a ratchet-tooth face engaged by said spring-arms, substantially as described.

3. The combination with a nut-lock, comprising a bolt a plate fitting non-rotatably thereon, and provided with outwardly-projecting spring-arms, a disk fitting and adapted to be turned on the bolt and provided with openings through which said spring-arms project, a nut engaging the bolt and provided with a ratchet-tooth face engaged by said spring-arms, and a washer between the disk and the nut and provided with openings through which the spring-arms project, all arranged substantially as described.

4. The combination with a nut-lock, comprising a bolt, a plate fitting non-rotatably thereon and provided with outwardly-projecting spring-arms and peripheral notches, a disk fitting and adapted to be turned on the bolt and provided with peripheral recesses registering with said notches, with peripheral lugs, and with openings through which said spring-arms project, a washer mounted non-rotatably on the bolt and provided with lugs engaging the recesses of the disk and the notches of the plate and with openings through which said spring-arms project, and a nut engaging the bolt and provided with a ratchet-tooth face engaged by said spring-arms, substantially as described.

In testimony whereof I affix my signature in the presence of two witnesses.

ANDREW M. BURLESON.

Witnesses:
H. C. RODGERS,
G. Y. THORPE.